(12) United States Patent
Paniconi et al.

(10) Patent No.: US 7,894,522 B2
(45) Date of Patent: Feb. 22, 2011

(54) CLASSIFIED FILTERING FOR TEMPORAL PREDICTION

(75) Inventors: Marco Paniconi, Campbell, CA (US); James J. Carrig, San Jose, CA (US); Zhourong Miao, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1532 days.

(21) Appl. No.: 11/229,286

(22) Filed: Sep. 16, 2005

(65) Prior Publication Data

US 2007/0064798 A1  Mar. 22, 2007

(51) Int. Cl.
*H04N 7/12* (2006.01)
*H04B 1/66* (2006.01)

(52) U.S. Cl. .............................. 375/240.12; 375/240.29

(58) Field of Classification Search ............ 375/240.12, 375/240.29, E7.129, E7.131, E7.133, E7.135, 375/E7.163, E7.261
See application file for complete search history.

(56) References Cited

U.S. PATENT DOCUMENTS

| | | | |
|---|---|---|---|
| 4,922,341 A | 5/1990 | Strobach | |
| 5,047,850 A | 9/1991 | Ishii et al. | |
| 5,654,771 A | 8/1997 | Tekalp | |
| 5,872,866 A | 2/1999 | Strongin et al. | |
| 5,974,188 A | 10/1999 | Benthal | |
| 6,178,205 B1 | 1/2001 | Cheung et al. | |
| 6,208,692 B1 | 3/2001 | Song et al. | |
| 6,212,235 B1 | 4/2001 | Nieweglowski et al. | |
| 6,298,144 B1 * | 10/2001 | Pucker et al. | 382/103 |
| 6,466,624 B1 | 10/2002 | Fogg | |
| 6,480,615 B1 | 11/2002 | Sun et al. | |
| 6,590,934 B1 | 7/2003 | Kim | |
| 6,591,015 B1 | 7/2003 | Yasunari et al. | |
| 6,608,865 B1 | 8/2003 | Itoh | |
| 6,690,729 B2 | 2/2004 | Hayashi | |
| 6,754,269 B1 | 6/2004 | Yamaguchi et al. | |
| 6,765,965 B1 | 7/2004 | Hanami et al. | |
| 6,782,054 B2 | 8/2004 | Bellers | |
| 6,813,313 B2 * | 11/2004 | Xu et al. | 375/240.08 |
| 6,864,994 B1 | 3/2005 | Harrington | |

(Continued)

FOREIGN PATENT DOCUMENTS

WO    WO 00/16563 A1    3/2000

(Continued)

OTHER PUBLICATIONS

Leymarie et al, Tracking Deformable Objects in the Plane Using an Active Contour Model, IEEE Trans. on Pattern Analysis and Mach. Intel., vol. 15 No. 6, Jun. 1993, pp. 617-634.

(Continued)

*Primary Examiner*—Bhavesh M Mehta
*Assistant Examiner*—Stephen R Koziol
(74) *Attorney, Agent, or Firm*—Blakely, Sokoloff, Taylor & Zafman LLP

(57) ABSTRACT

A method of performing a temporal prediction includes using an irregular filter tap to produce a prediction of a target image, and applying a regular filter tap to the prediction to produce an enhanced prediction.

11 Claims, 11 Drawing Sheets

U.S. PATENT DOCUMENTS

| | | | |
|---|---|---|---|
| 2003/0206583 A1* | 11/2003 | Srinivasan et al. | 375/240.01 |
| 2004/0017852 A1* | 1/2004 | Garrido et al. | 375/240.16 |
| 2004/0057517 A1 | 3/2004 | Wells | |
| 2004/0062307 A1 | 4/2004 | Hallapuro et al. | |
| 2004/0131267 A1 | 7/2004 | Adiletta et al. | |
| 2004/0233991 A1 | 11/2004 | Sugimoto et al. | |
| 2005/0100092 A1 | 5/2005 | Sekiguchi et al. | |
| 2005/0135483 A1 | 6/2005 | Nair | |
| 2005/0265451 A1* | 12/2005 | Shi et al. | 375/240.15 |
| 2007/0064802 A1* | 3/2007 | Paniconi et al. | 375/240.16 |
| 2007/0064807 A1* | 3/2007 | Paniconi et al. | 375/240.16 |
| 2007/0230914 A1* | 10/2007 | Garrido et al. | 386/98 |

FOREIGN PATENT DOCUMENTS

| | | |
|---|---|---|
| WO | WO 01/78402 A1 | 10/2001 |
| WO | WO 02/37859 A2 | 5/2002 |
| WO | WO 2004/047454 A1 | 6/2004 |
| WO | WO 2005/069629 A1 | 7/2005 |

OTHER PUBLICATIONS

Reshef et al, Low Bit-Rate Video Coding Using Iterave Affine Motion Estimation and Quadtree Segmentation, Proc. Int'l Conf. on Dig. Signal Processing, Jun. 1995 pp. 427-431.

Chang et al, Simultaneous Motion Estimation and Segmentation, IEEE Transactions on Image Processing, vol. 6 No. 9, Sep. 1997, pp. 1326-1333.

Zhang et al, Image Sequence Segmentation Using 3-D Structure Tensor and Curve Evolution, IEEE Trans. on Circuits and Sys. For Video Tech., vol. 11 No. 5, May 2001, pp. 629-640.

Orchard et al, Overlapped Block Motion Compensation: An Estimation-Theoretic Approach, IEEE Transactions on Image Processing, vol. 3 No. 5, Sep. 1994, pp. 693-699.

Du et al, Two Dimensional Hierarchical Mesh Based Video Compression Techniques, 6th Int'l Symposium on Dsp for Communication Systems, 2002, Sydney Australia, pp. 247-252.

* cited by examiner

CLASSIFIED FILTERING FOR TEMPORAL PREDICTION

FIELD OF INVENTION

The invention is related to the field of video compression.

BACKGROUND

A temporal prediction filter is used in a video compression process to predict a target image from a set of previously decoded reference images. The temporal prediction process is effective at removing a significant amount of temporal redundancy, which generally results in a higher coding efficiency. The prediction process uses a set of motion vectors and a filter that operates on the motion vectors to predict the target image.

For example, the prediction method divides a reference image 110 into multiple fixed-size blocks 120, as shown in FIG. 1. Each block has an associated motion vector to describe the motion of the block relative to the target image. The motion vectors are shown by the white dots in image 110. A temporal prediction filter uses the associated motion vector to perform a simple motion compensation technique on each block in the reference image to predict the location of the block in the target image. Thus, each block in the target image is estimated from a block in the reference image using the single motion vector. However, this approach treats each motion vector independently and is not adaptive to image features.

Conventional temporal filters, which use a single motion vector to predict the location of an associated block, or rely on a filter defined for a regular motion vector pattern, need a regular distribution of motion vectors to perform temporal prediction. Therefore, they are unable to adapt the prediction process to an irregular pattern of motion vectors. There is a need for a filter that can locally adapt its tap and filter coefficients to the variations of an irregular pattern of motion vectors. There is also a need for a temporal filter that has flexibility to adapt to object boundaries and spatial textures.

SUMMARY

A method of performing a temporal prediction includes using an irregular filter tap to produce a prediction of a target image, and applying a regular filter tap to the prediction to produce an enhanced prediction.

BRIEF DESCRIPTION OF THE DRAWINGS

The present invention is illustrated by way of example and may be better understood by referring to the following description in conjunction with the accompanying drawings, in which.

DETAILED DESCRIPTION

In the following description, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. For example, skilled artisans will understand that the terms field or frame or image that are used to describe the various embodiments are generally interchangeable as used with reference to video data.

A least squared classified temporal filter automatically adapts to an irregular pattern of motion vectors, object features, and spatial textures when predicting a target image. The least squared classified filter operates in the time-domain over motion compensated signals, which is different from other methods that attempt to filter motion vectors directly (e.g., triangulation filtering in the motion vector domain). For example, because the least squared classified filtering method operates in the time-domain, it is more amenable to adaptation to object and spatial textures. In one embodiment, the least squared classified temporal filter performs a two stage process. The first stage adapts the filter to an irregular sampling pattern of motion vectors, to object shapes, and to object boundaries. The second stage adapts the filter to spatial textures of the image.

Figure 1:
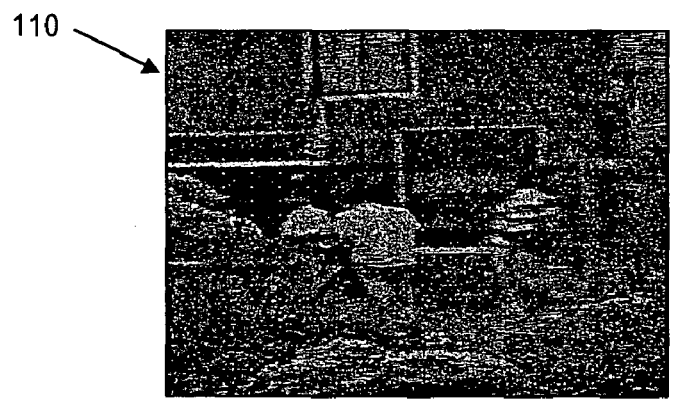
FIG. 1 shows an example of a conventional block based temporal filter.
Figure 1:
Figure 1:
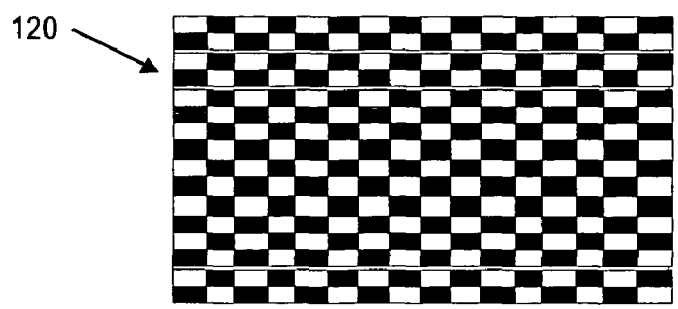
Figure 2:
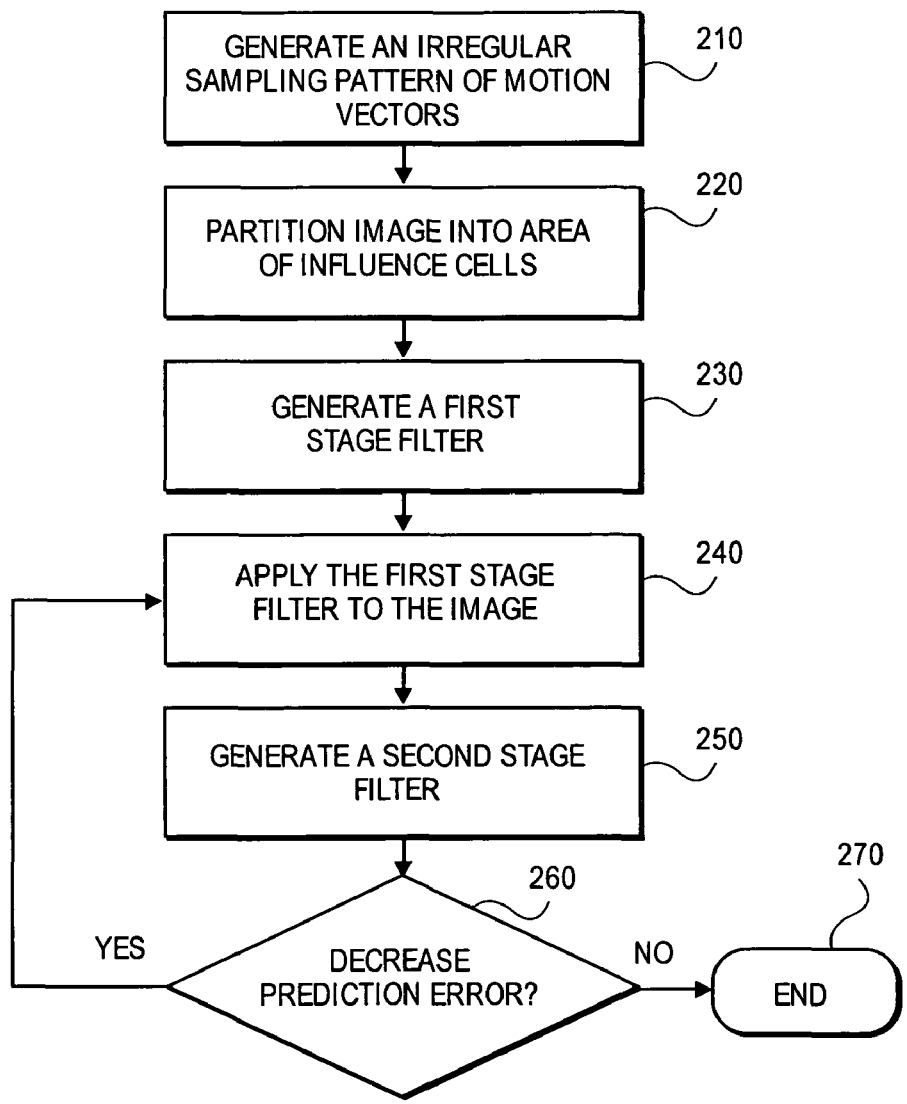
FIG. 2 shows an example of a two stage adaptive temporal filtering procedure.

An example of a least squared classified temporal filtering procedure is shown in FIG. 2. At 210, an irregular sampling pattern of motion vectors is generated for an image. Such irregular patterning may be done in various ways using methods that are known to those of skill in the art. An example of an irregular pattern of motion vectors is shown in block 310 of FIG. 3. The white dots in the image 310 represent the motion vectors. With this adaptive sampling pattern, the motion vectors are more concentrated in regions that are difficult to predict from the reference image (i.e., image regions with more complex motion, such as regions near moving boundaries). Fewer motion vectors are placed in simple motion regions, such as image background regions, for example.

Figure 4:
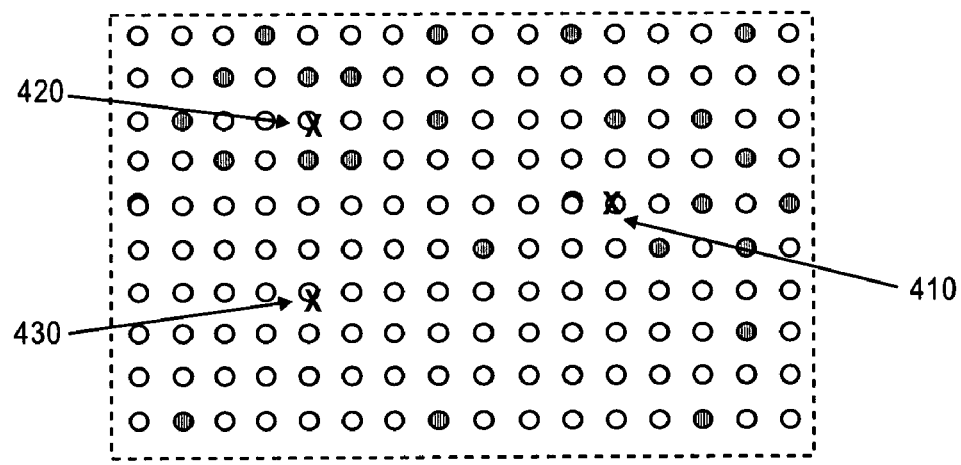
FIG. 4 shows an example of an irregular motion vector pattern that forms different local neighborhoods for different target pixels, which is processed by the adaptive temporal filtering procedure.

Another example of an irregular pattern of motion vectors is shown in FIG. 4. The shaded circles represent motion vectors, and each x represents a pixel to be predicted. Pixel 420 is in a local neighborhood of densely populated and irregularly distributed motion vectors, pixel 410 is in a local neighborhood of motion vectors that have a quasi-regular distribution, and pixel 430 is in a local neighborhood of sparsely populated motion vectors. Because the pixels to be predicted have different local neighborhoods of motion vectors, i.e., each local neighborhood has a different distribution of motion vectors, a filter structure that adapts to the changing distribution is used to predict the pixels.

Figure 3:
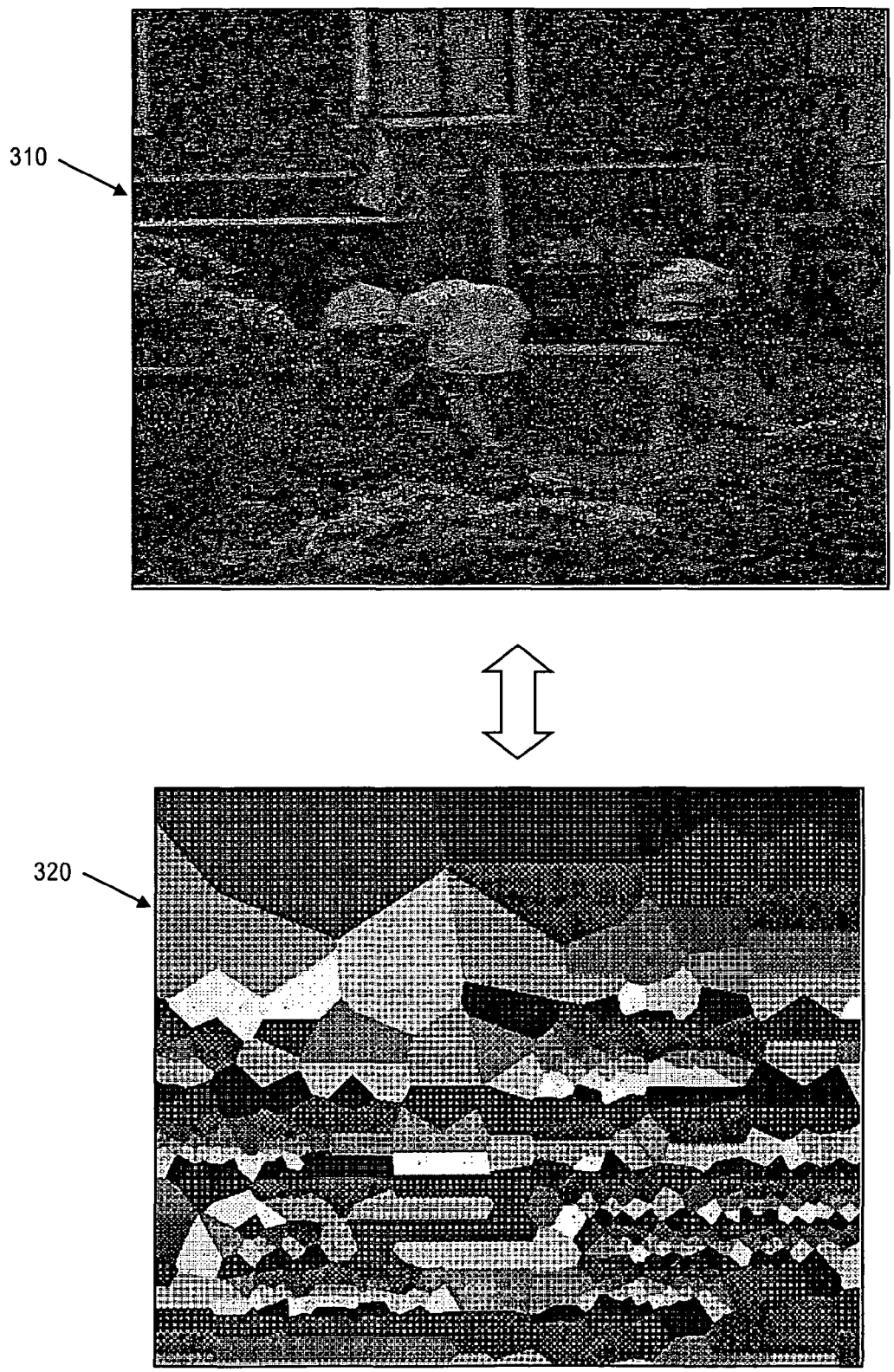
FIG. 3 shows an example of an irregular pattern of motion vectors and an example of area of influence cells used in the adaptive temporal filtering procedure.

Returning to FIG. 2, at 220, the image is partitioned into multiple cells, called area of influence cells (AOI cells), where each AOI cell has one motion vector as its node. For example, the image 310 of FIG. 3 is partitioned into AOI cells as shown at block 320. Each AOI cell represents a region that is influenced more by the motion vector inside of the cell than by any other motion vector in the image. Because an AOI cell is generated for each motion vector, the size of the AOI cells may be related to features of objects in the image, such as boundary regions. For example, AOI cells near a boundary region between objects may be smaller than AOI cells in an image background region. Also, the shape of the AOI cell can be locally modified to adapt to the shape of an object's boundary. One embodiment of a method for generating AOI cells is a distance nearest motion vector partitioning method. Other partitioning methods may be used, such as block or triangular methods for example. As will be discussed below, in the second stage least squared filter process, the AOI cells are used as a natural image segmentation over which to define a classification map (i.e., each AOI cell may use a different filter).

Returning to FIG. 2, at 230, a first stage adaptive temporal prediction filter is generated for predicting the pixels in the target image using the irregular pattern of motion vectors and the area of influence cells. The first stage prediction filter operates in the time-domain over motion compensated signals. In particular, the filter predicts a target pixel by using a weighted sum of different motion compensated signals, where each motion compensated signal is obtained by applying a different motion vector to predict the target pixel. The filter coefficients and tap structure change for each pixel in accordance with the changing pattern of motion vectors. Also, the support of the filter is local. This means that the motion vectors used to compensate a target pixel are obtained from the local neighborhood of that pixel.

The first stage filter has the following structure. Let $\{v_j\}$ denote the set of N motion vectors, and I(x) the reference image (a previously decoded image). Let S(x) denote some set of motion vectors surrounding the location of pixel x. The prediction of that target pixel x can be generally expressed as:

$$I^{pred}(x) = \sum_{i \in S(x)} f_i I^{ref}(x + v_i)$$

where $\{f_i\}$ is a set of filter coefficients, and $x+v_i$ is the motion compensated pixel when motion vector $v_i$, is applied to pixel x. The support or tap of the filter is defined by the set S(x). The tap support S(x) and the filter coefficients $\{f_i\}$ are, in general, functions of the pixel position x and its neighboring motion vectors. That is, the filter coefficients can change for each pixel, because the distribution of motion vectors changes throughout the image. Hence, the filter locally adapts to the changing motion vector pattern.

At 240, the first stage prediction filter is applied to the target image to perform temporal prediction for the target image. The filter is applied in the time domain to generate a prediction result for the target image given the set of motion vector values and sampling pattern. The filter uses a filter tap and filter coefficients that are defined by an area of overlapping regions to capture the relevance of motion vectors neighboring a pixel to be predicted. An example of this class of prediction filters is an area of influence filter disclosed in co-pending U.S. application Ser. No. 11/229,284 entitled ADAPTIVE AREA OF INFLUENCE FILTER by Marco Paniconi et al., concurrently filed with the present application and incorporated herein by reference; another example is a triangulation filter for motion compensated signals.

Figure 5:
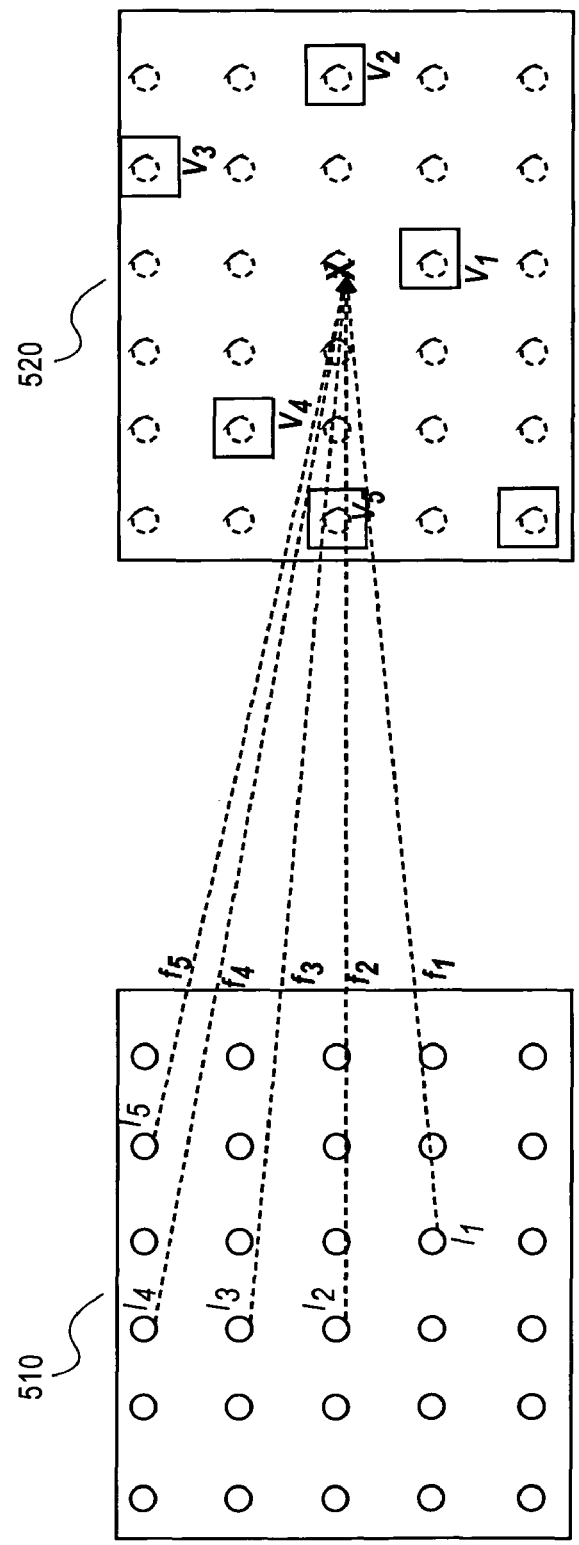
FIG. 5 shows an example of a prediction performed with the adaptive temporal filter.

An example of applying the first stage filter to generate the temporal prediction is shown in FIG. 5. Pixels in a reference image 510 are used to predict pixels in a target image 520. The reference pixels are represented by solid circles in reference image 510, and the target pixels to be predicted are represented by dashed circles in target image 520. The filter forms a prediction for pixel x in the target image 520 using a tap structure of local motion vectors $v_1$ through $v_5$. The motion vectors are local to pixel x because each of their respective AOI cells overlap with at least a portion of the AOI cell for pixel x. Each motion vector $\{v_i\}$ in the tap structure maps to image data $\{I_i\}$ in the reference image 510. The adaptive temporal prediction filter adjusts the reference data $\{I_i\}$ by a filter weight $\{f_i\}$ to predict pixel x.

In one embodiment, the prediction filter uses the tap structure and the filter weights to generate a prediction according to the following equation:

Prediction=$I_1 * f_1 + I_2 * f_2 + I_3 * f_3 + I_4 * f_4 + I_5 * f_5$ where the filter tap, which is defined by the local motion vectors, and the filter coefficients $\{f_i\}$, are determined when the filter is generated at 230.

Returning to FIG. 2, at 250, a second stage filter is generated and is applied to the prediction from the first stage filter. Because the prediction that is output from the first stage filter is in the form of a regular pattern of sampled data, a least squared (LS) trained filter is applied to the prediction to enhance the spatial textures of the prediction of the target image. At 260 if the prediction error needs to be decreased the method returns to 240. Otherwise at 270 the method ends.

Figure 6:
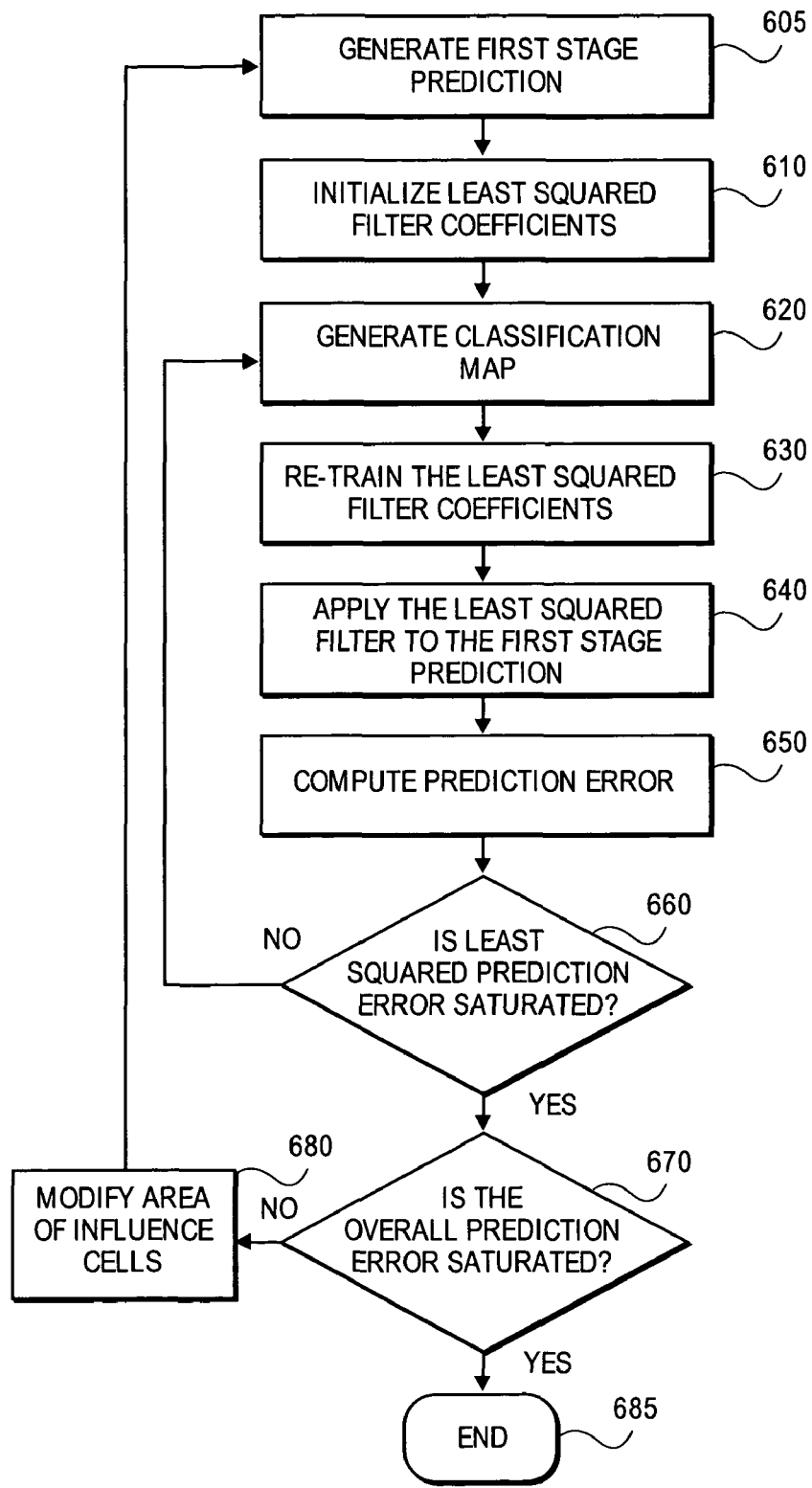
FIG. 6 shows an example of a method for generating the least squared classified filter.

Referring to 250 in greater detail, FIG. 6 shows an example of a method for generating the second stage filter. The first stage filter processes the irregular pattern of motion vectors to form a predicted image $P^o$ defined at every pixel. Each motion vector is associated with an area of influence cell $\{A_{j}, i=1, \ldots S\}$, where S is the total number of area of influence cells. At 605, the prediction generated by the first stage filter is input to the second stage.

At 610, a set of least squared filter coefficients $\{f_j^o, j=1 \ldots N\}$ is initialized by performing least squared training on the target image, where N is the number of filter classes used in the second stage. For example, the least squared training can be performed on the target image shown in FIG. 3.

At 620, a classification map $\{C^o(i), i=1, \ldots S\}$ is generated to map each area of influence cell to a least squared filter index. Initially the classification maps all cells to each filter index. Then, given the set of least squared filter coefficients $\{f_j^t\}$, the classification map is generated as follows. For each node cell, $A_i$, select the filter that minimizes the prediction error in the cell $A_i$. This results in a new classification map $C^{t+1}$ (i).

Figure 7:
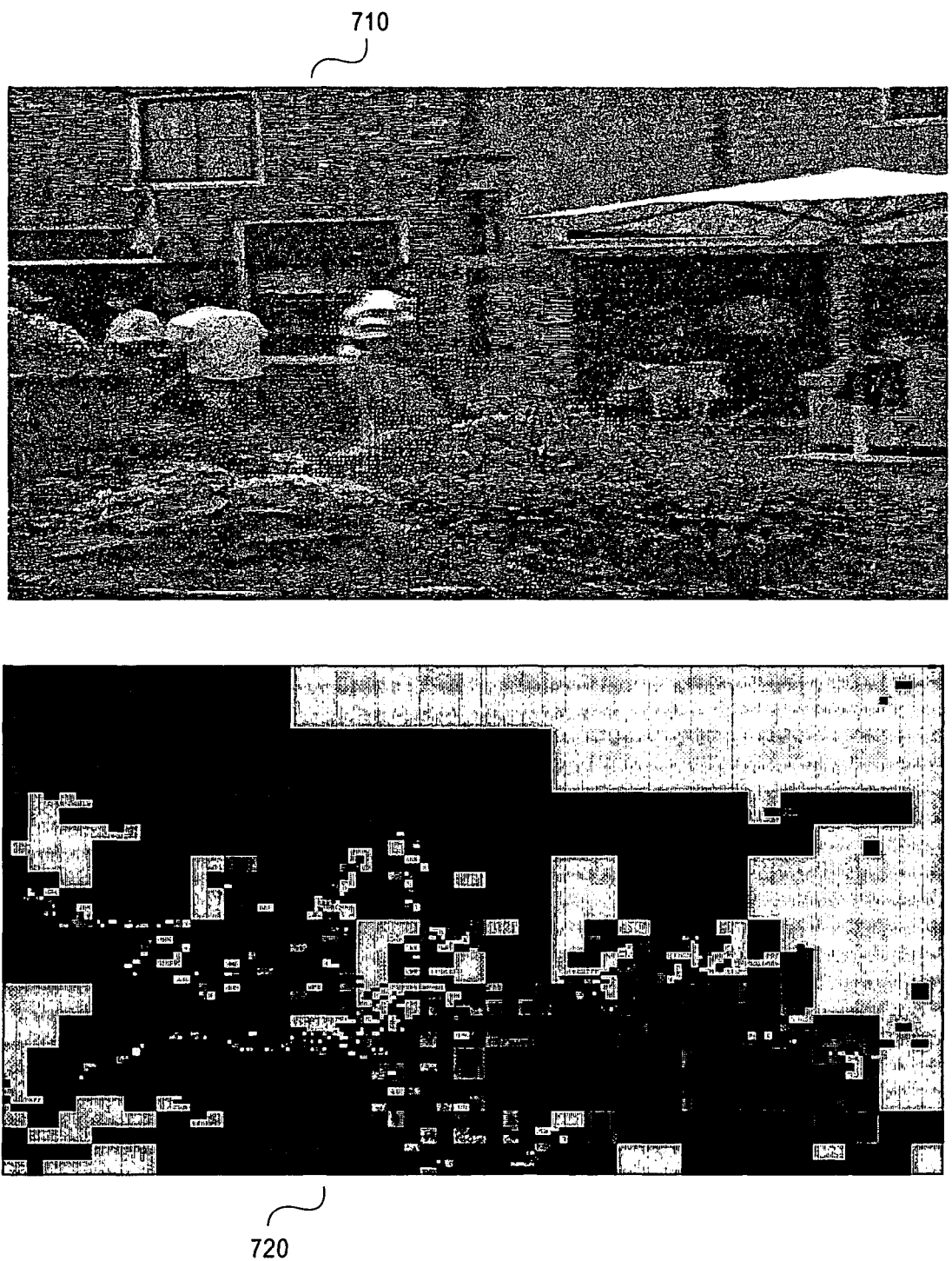
FIG. 7 shows an example of a classification map produced by the least squared classified filtering process.

An example of a classification map that is generated to map each area of influence cell to an appropriate filter is shown in FIG. 7. The target image 710 has an irregular distribution of motion vectors. In this example, each motion vector has an associated rectangular area of influence cell, as shown in 720. The filter for this example has four classes, and each area of influence cell is mapped to one of the four classes. Each filter class is shown by a particular shading in the classification map of the area of influence cells at 720.

Returning to FIG. 6, at 630, a new set of least squared filter coefficients are generated. This is performed by using the classification map to re-train the least squared filter coefficients with their respective area of influence cells from the target image. That is, least squared training is used to produce a new filter coefficient $f_{k+1}{}^t$ for each cell $k=C^{t+1}(i)$, $i=1, \ldots S$. The result is a new set of least squared filter coefficients $f_k{}^{t+1}$, $k=1 \ldots N$.

At 640, the least squared filter coefficients and the classification map are applied to the predicted image generated by the first stage, $P^o$, to form an enhanced prediction of the target image $P^{t+1}$.

At 650, a prediction error between the target image and the enhanced predicted image $P^{t+1}$ is computed. At 660, the method determines whether the least squared prediction error is saturated. If not, the method sets the counter t=t+1 and returns to 620, where the classification map is modified and filter coefficients are retrained.

If the least squared prediction error is saturated, the method continues to 670, to determine whether the overall prediction error is saturated. If not, at 680, the enhanced predicted image is used as feedback to modify the AOI cells to include only those pixels that have a similar spatial texture. Then, the method returns to 605. Otherwise, the method ends at 685.

Figure 8:
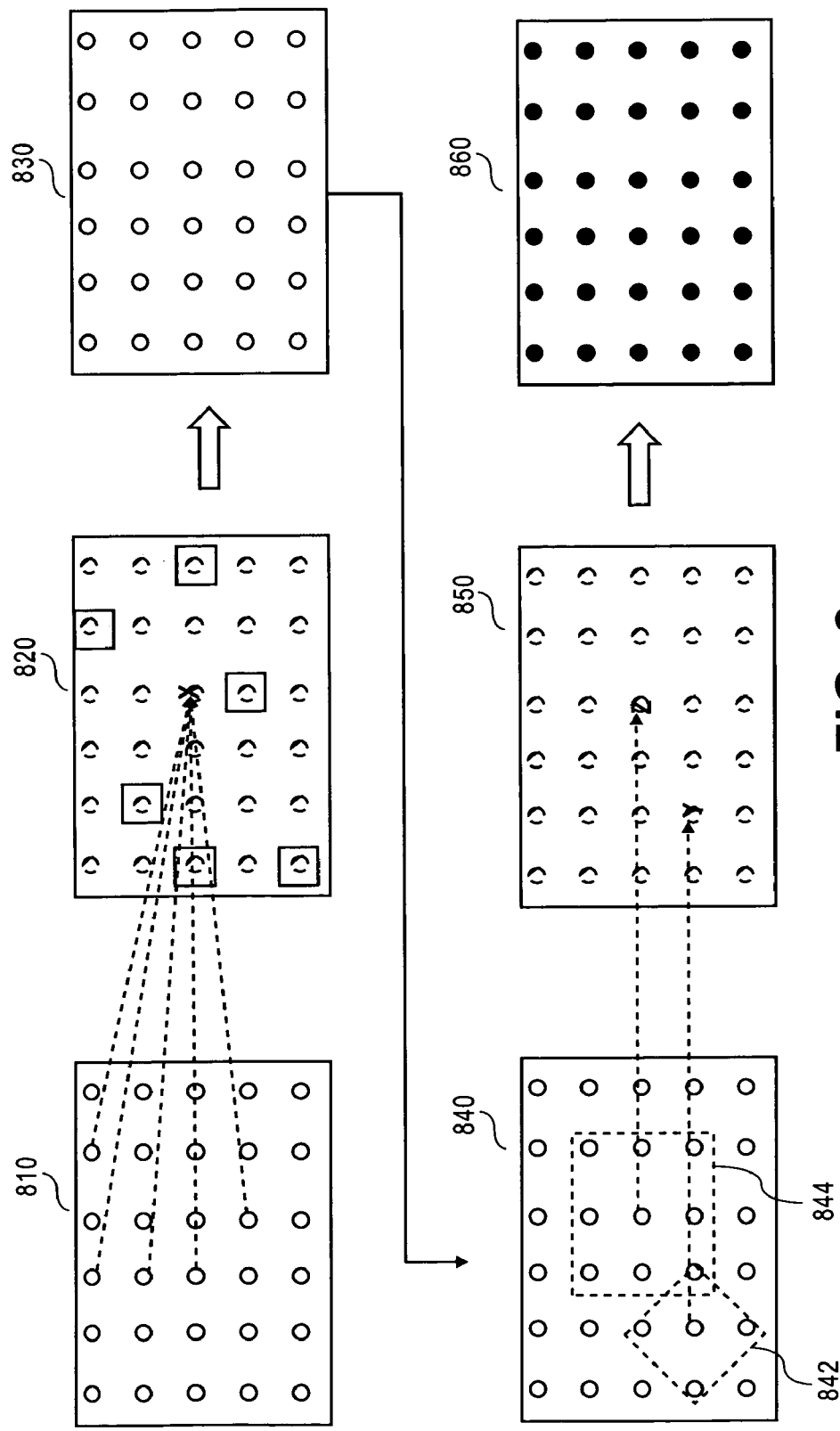
FIG. 8 shows an example of first stage and second stage filters for predicting a target image.

FIG. 8 shows an example of first stage and second stage filters for predicting a target image. The first stage filter 820 operates on an irregular pattern of motion vectors and reference image 810 when predicting each target pixel x to generate a prediction of the target image 830. The first stage filter 820 uses an irregular filter tap structure (shown by the squares in 820) to generate the prediction. The second stage filter 840 uses a regular filter tap structure centered on a target pixel to enhance the predicted image. For example, the second stage filter 840 uses a least squared filter 842 to predict target pixel y in target image 850 and a least squared filter 844 to predict target pixel z in target image 850 to form compensated image 860.

Figure 9:
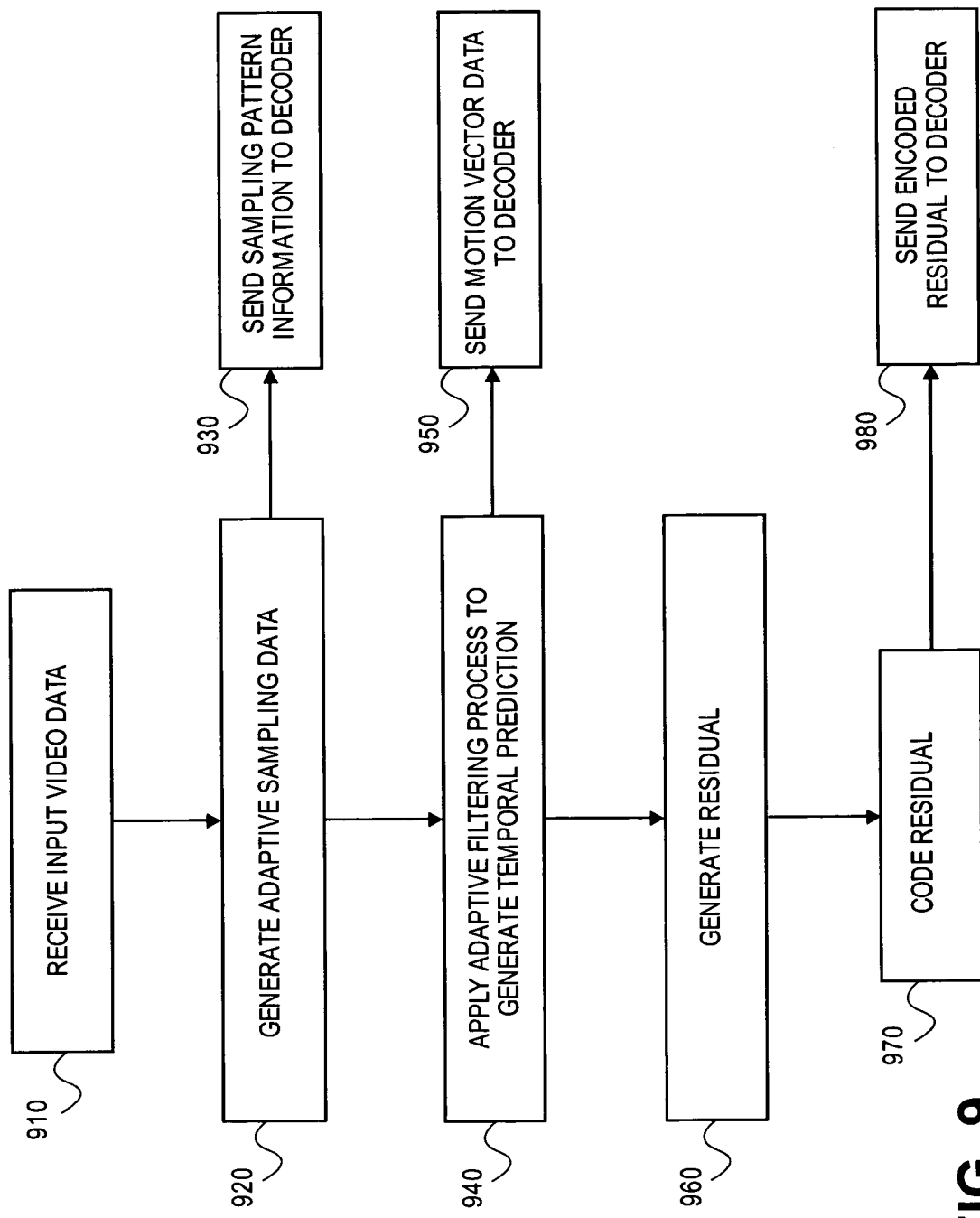
FIG. 9 shows an example of a video compression encoding process that uses the adaptive temporal filter.

In one embodiment, the least squared classification filter is used by a temporal prediction filtering process for encoding an image (or frame, or field) of video data, as shown in FIG. 9. At 910, an encoder receives an input target image. (A set of reference images, which contain decoded image data related to the target image, is available to the encoder during the encoding process, and also to the decoder during the decoding process). At 920, the encoder generates a sampling, or distribution, of motion vectors associated with the target image. That is, given a number N of motion vectors, these N motion vectors are placed in the target image. The positions of the motion vectors are generally adapted to areas of motion in the image content, yielding an irregular pattern of motion vectors as shown in FIG. 3, for example. At 930, the sampling pattern information (e.g., bits to represent the pattern) is transmitted to a decoder. Many approaches can be used to generate the adaptive sampling pattern.

At 940, the temporal prediction filtering process is applied to the irregular motion sampling pattern. This two stage adaptive filtering process with least squared classified training uses the motion vectors, irregular sampling pattern, and reference images to generate a prediction of the target image. At 950, the motion vector values are coded and sent to the decoder. At 960, a residual is generated, which is the actual target data of the target image minus the prediction error from the adaptive filtering process. At 970, the residual is coded and, at 980 is sent to the decoder.

Figure 10:
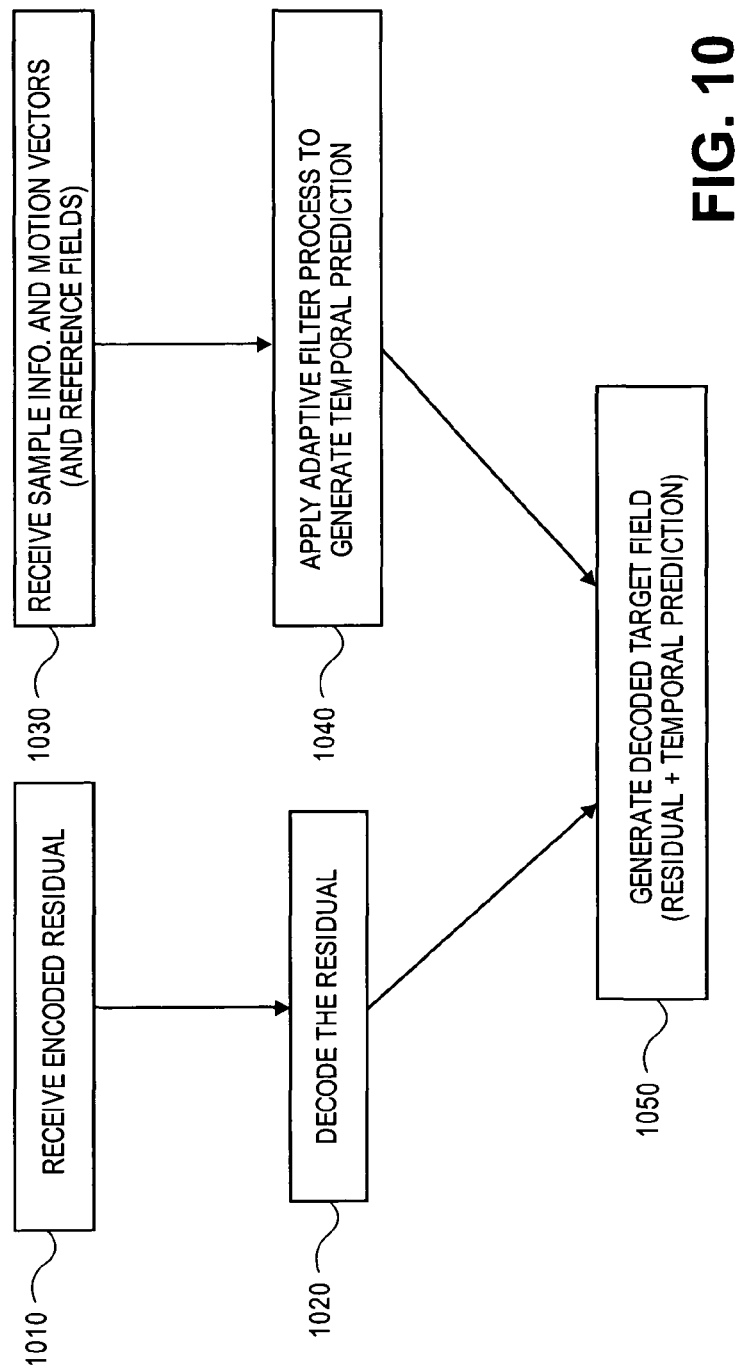
FIG. 10 shows an example of a decoding process that uses the adaptive temporal filter.

In another embodiment, the least squared classification filter is used in decoding a image (or frame, or image) of video data, as shown in FIG. 10. At 1010, an encoded residual is received. At 1020, the decoder decodes the received encoded residual. At 1030, the decoder receives the sample pattern information, reference images, and motion vector values. Then, at 1040 the decoder applies the two stage adaptive temporal filter procedure to generate the temporal prediction.

At 1050, the decoded target image is generated by adding the decoded residual to the temporal prediction.

Figure 11:
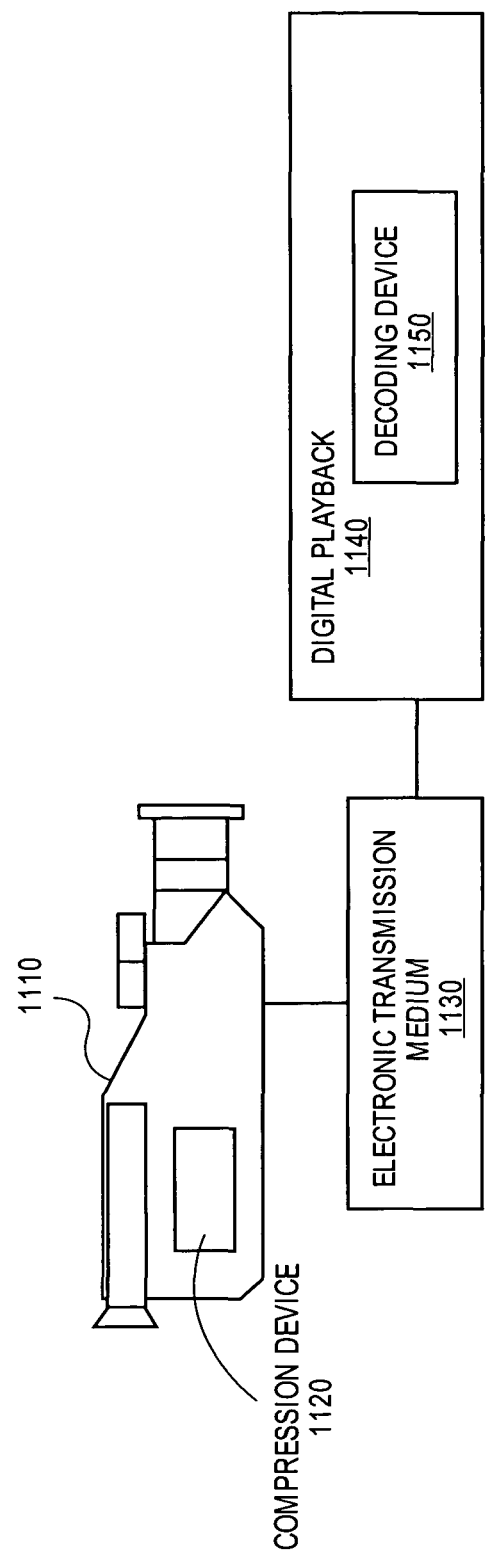
FIG. 11 shows an example of a system that uses the adaptive temporal filter.

FIG. 11 shows an example of a system that uses the adaptive temporal prediction filter. A digital video camera 1110 captures images in an electronic form, and processes the images using compression device 1120, which uses the adaptive temporal filtering process during the compression and encoding process. The encoded images are sent over an electronic transmission medium 1130 to digital playback device 1140. The images are decoded by decoding device 1150, which uses the filter during the decoding process. Camera 1110 is illustrative of various image processing apparatuses (e.g., other image capture devices, image editors, image processors, personal and commercial computing platforms, etc.) that include embodiments of the invention. Likewise, decoding device 1150 is illustrative of various devices that decode image data.

While the invention is described in terms of embodiments in a specific system environment, those of ordinary skill in the art will recognize that the invention can be practiced, with modification, in other and different hardware and software environments within the spirit and scope of the appended claims.

The invention claimed is:

1. A method carried out in an electronic data processor, comprising:
   using an irregular filter tap to produce a prediction of a target image, wherein the irregular filter tap is generated from an irregular pattern of motion vectors and area of influence cells;
   performing least squared training on the prediction of the target image to produce a set of least squared filter coefficients;
   generating a classification map by selecting, for each area of influence cell, the filter with smallest prediction error for that area of influence cell;
   using the classification map to re-train the least squared filter coefficients; and
   using the re-trained filter coefficients to enhance the prediction of the target image.

2. The method of claim 1, further comprising:
   re-generating the classification map and re-training the least squared filter coefficients until a least squared prediction error is saturated.

3. The method of claim 1, further comprising:
   using the enhanced prediction to modify the area of influence cells to include pixels having a similar spatial texture.

4. An apparatus comprising:
   an irregular filter tap that produces a prediction of a target image, wherein the irregular filter tap is generated from an irregular pattern of motion vectors and area of influence cells;
   a least squared trainer that performs least squared training on the prediction of the target image to produce a set of least squared filter coefficients;
   a map generator that generates a classification map that maps, for each area of influence cell, a filter with the smallest prediction error for that area of influence cell;
   a re-trainer that uses the classification map to re-train the least squared filter coefficients; and
   a prediction enhancer that uses the re-trained filter coefficients to enhance the prediction of the target image.

5. The apparatus of claim 4, wherein the re-trainer further comprises:
a least squared error reducer that re-trains the least squared filter coefficients until a least squared prediction error is saturated.

6. The apparatus of claim 4, further comprising:
a cell modifier that uses the enhanced prediction to modify the area of influence cells to include pixels having a similar spatial texture.

7. The apparatus of claim 6, further comprising:
a prediction error reducer that uses the modified area of influence cells and the irregular filter tap to reduce a prediction error of the prediction of the target image.

8. A non-transitory computer readable medium storing a program of instructions which, when executed by a processing system, cause the system to perform a method comprising:
using an irregular filter tap to produce a prediction of a target image, wherein the irregular filter tap is generated from an irregular pattern of motion vectors and area of influence cells;
performing least squared training on the prediction of the target image to produce a set of least squared filter coefficients;
generating a classification map by selecting, for each area of influence cell, the filter with smallest prediction error for that area of influence cell;
using the classification map to re-train the least squared filter coefficients; and
using the re-trained filter coefficients to enhance the prediction of the target image.

9. The non-transitory computer readable medium of claim 8, further comprising:
re-training the least squared filter coefficients until a least squared prediction error is saturated.

10. The non-transitory computer readable medium of claim 8, further comprising:
using the enhanced prediction to modify the area of influence cells to include pixels having a similar spatial texture.

11. The non-transitory computer readable medium of claim 10 further comprising:
using the modified area of influence cells and the irregular filter tap to reduce a prediction error of the prediction of the target image.

* * * * *